United States Patent [19]

Yamamoto et al.

[11] Patent Number: 6,051,205
[45] Date of Patent: *Apr. 18, 2000

[54] PROCESS FOR SYNTHESIS OF HIGH-SILICA SILICATE MOLECULAR SIEVE

[75] Inventors: Azuma Yamamoto, Toyohashi; Akira Takahashi, Nagoya; Takuya Hiramatsu, Nagoya; Kenji Suzuki, Nagoya, all of Japan

[73] Assignee: NGK Insulators, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/005,819

[22] Filed: Jan. 13, 1998

[30] Foreign Application Priority Data

Jan. 20, 1997 [JP] Japan .................................. 9-007484
Oct. 3, 1997 [JP] Japan .................................. 9-270960

[51] Int. Cl.$^7$ .................................................. C01B 39/06
[52] U.S. Cl. .......................... 423/700; 423/705; 423/713; 423/DIG. 27; 502/74
[58] Field of Search ..................................... 423/700, 705, 423/713, DIG. 27, 326, 328.2; 502/74

[56] References Cited

U.S. PATENT DOCUMENTS

| | | | |
|---|---|---|---|
| 4,208,305 | 6/1980 | Kouwenhoven et al. | 423/326 |
| 4,371,628 | 2/1983 | Nanne et al. | 423/713 |
| 4,853,203 | 8/1989 | Guth et al. | 423/326 |
| 5,110,570 | 5/1992 | Bellussi et al. | 423/DIG. 27 |
| 5,219,813 | 6/1993 | Kumar et al. | 423/326 |
| 5,554,356 | 9/1996 | Sexton et al. | 423/DIG. 27 |
| 5,677,254 | 10/1997 | Nojima et al. | 423/713 |

FOREIGN PATENT DOCUMENTS

| | | |
|---|---|---|
| 0 064 328 A1 | 11/1982 | European Pat. Off. . |
| 0 108 271 A2 | 5/1984 | European Pat. Off. . |
| 0 115 031 A1 | 8/1984 | European Pat. Off. . |
| 0 136 068 A2 | 4/1985 | European Pat. Off. . |
| 0 891 809 A1 | 1/1999 | European Pat. Off. . |
| 271 101 A1 | 8/1989 | Germany . |
| 281 172 A5 | 8/1990 | Germany . |
| 2-75327 | 3/1990 | Japan . |
| 4-293519 | 10/1992 | Japan . |
| 6-63392 | 3/1994 | Japan . |
| 2 122 637 | 1/1984 | United Kingdom . |

OTHER PUBLICATIONS

The 72nd Discussion on Catalyst (1993 Fall) Preliminary Draft 3H318 (pp. 248–249) (No Month).

Chemical Abstracts, vol. 127, No. 2; Jul. 14, 1997; Columbus, Ohio; abstract No. 22858; Yamamoto Azumaet al; "Hydrothermal–resistant crystalline aluminosilicate salt molecular sieves and their use as hydrocarbon adsorbents" XP002091981 *abstract* & JP 09 099207 A (NGK Insulators, Ltd); Apr. 15, 1997.

*Primary Examiner*—Elizabeth Wood
*Assistant Examiner*—David Sample
*Attorney, Agent, or Firm*—Parkhurst & Wendel L.L.P.

[57] ABSTRACT

A process for synthesizing a high-silica aluminosilicate molecular sieve, includes: subjecting, to hydrothermal synthesis, a raw material containing Al, H, O and Si and, as other elements, at least Fe and having a Si/Al molar ratio of 50 or more and a Si/Fe molar ratio of 80 or less (45 or less when a high-silica aluminosilicate molecular sieve having a β type zeolite structure is produced) and then subjecting the resulting material to heat treatment in an oxidizing atmosphere at 300° C. or more. The above process can synthesize a high-silica zeolite low in Al content directly without dealumination operation, and can provide process simplification and a higher yield.

5 Claims, No Drawings

PROCESS FOR SYNTHESIS OF HIGH-SILICA SILICATE MOLECULAR SIEVE

BACKGROUND OF THE INVENTION (1) Field of the Invention

The present invention relates to a process for synthesizing a high-silica aluminosilicate molecular sieve which can be preferably used as a hydrocarbon adsorbent of exhaust gas purification system.

(2) Description of Related Art

In order for an exhaust gas purification system for an automobile or the like to be able to exhibit its catalytic activity, the catalyst used therein must be heated to at least its lowest operating temperature by, for example, the heat of exhaust gas. Therefore, when the temperature of exhaust gas is low as seen in the cold start of engine, the harmful components (e.g. HC, CO and NOx) of exhaust gas are hardly purified. HC, in particular, is generated in a large amount during the cold start and its purification is an important task.

In order to improve the efficiency of HC purification during the cold start, there have heretofore been known techniques of using, as a HC adsorbent, a molecular sieve made of a crystalline aluminosilicate (e.g. zeolite) and allowing the adsorbent to adsorb HC until the exhaust gas purification system used reaches its operating temperature.

For example, Japanese Patent Application Laid-Open No. 75327/1990 discloses an exhaust gas purification system for an automobile, using a Y type zeolite or mordenite as an HC adsorbent. Japanese Patent Application Laid-Open No. 293519/1992 proposes use of an adsorbent obtained by subjecting a $H^+$ type ZSM-5 zeolite to ion exchange with Cu and Pd, in order to alleviate the effect of water adsorption, improve HC adsorbability and widen the temperature range of adsorption. Japanese Patent Application Laid-Open No. 63392/1994 proposes, for the same purpose, use of an H-, Cu- or Pd-ion exchanged pentasil type metallosilicate as an adsorbent.

With respect to the above pentasil (pentasil is a generic name for structures similar to ZSM-5) type zeolite, a relatively high-silica product can be synthesized easily and even a product having a Si/Al molar ratio of substantially infinity (containing no Al) can be synthesized by using a template.

However, direct synthesis of pentasil type zeolite of high Si/Al molar ratio (>50) by using no template has heretofore been difficult.

Meanwhile, β type zeolite and mordenite type zeolite are known to have large lattice strain when containing no Al, as compared with pentasil type zeolite. Therefore, in synthesizing β type zeolite and mordenite type zeolite, it has been necessary to add Al (which has an ionic radius different from that of Si) in a certain amount to alleviate said lattice strain. As a result, the β type zeolite and mordenite type zeolite synthesized had a Si/Al molar ratio of about 50 or less.

While zeolites differ in heat resistance and hydrothermal resistance depending upon the crystal structures, among zeolites of the same crystal structure, a zeolite of higher Al content has lower heat resistance and lower hydrothermal resistance.

Therefore, in order to allow a zeolite to have higher heat resistance and higher hydrothermal resistance, it is necessary to reduce the Al content in zeolite.

However, there has been no assurance that a zeolite having a pore structure suited for HC molecules to be adsorbed can be synthesized directly so as to have a low Al content at which desired heat resistance can be obtained.

Hence, when the Al content is higher than desired, it has been necessary to remove excessive Al (dealumination operation) by steam treatment, acid treatment or the like and repeat the operation until a desired Al content is obtained.

SUMMARY OF THE INVENTION

The present invention has been made in view of the above-mentioned problems, and an object of the present invention is to provide a process for making a high-silica silicate molecular sieve by directly synthesizing a low-Al content zeolite without a dealumination operation, which process can provide process simplification and a higher yield.

The high-silica aluminosilicate molecular sieve synthesized by the present process can be preferably used in applications where high heat resistance or high hydrothermal resistance is required, for example, the HC adsorbent used in the exhaust gas purification system (e.g. in-line type exhaust gas purification system) of an internal combustion engine.

According to the present invention there can be provided a process for directly synthesizing a high-silica aluminosilicate molecular sieve, which comprises subjecting, to hydrothermal synthesis, a raw material containing Al, H, O and Si and, as other elements, at least Fe and having a Si/Al molar ratio of 50 or more and a Si/Fe molar ratio of 80 or less and then subjecting the resulting material to heat treatment in an oxidizing atmosphere at 300° C. or more.

According to the present invention there can also be provided a process for synthesizing a high-silica aluminosilicate type molecular sieve having a β type zeolite structure, which comprises subjecting, to hydrothermal synthesis, a raw material containing Al, H, O and Si and, as other elements, at least Fe and having a Si/Al molar ratio of 50 or more and a Si/Fe molar ratio of 45 or less and then subjecting the resulting material to heat treatment in an oxidizing atmosphere at 300° C. or more.

In the present process, it is preferable that the raw material contains a $Na^+$ source and the $Na^+$ source contains NaOH; and it is also preferable that the $Na^+$ source contains NaOH and NaCl and the NaOH:NaCl molar ratio is 3:4 to 7:0.

In the present process, it is preferable to conduct the heat treatment in an oxidizing atmosphere at 650–1,050° C.

DETAILED DESCRIPTION OF THE INVENTION

The process for synthesizing a high-silica silicate molecular sieve according to the present invention comprises subjecting, to hydrothermal synthesis, a raw material containing Al, H, O and Si and, as other elements, at least Fe and having a Si/Al molar ratio of 50 or more and a Si/Fe molar ratio of 80 or less and then subjecting the resulting material to heat treatment in an oxidizing atmosphere at 300° C. or more, preferably 650–1,050° C.

Herein, "hydrothermal synthesis" refers to an operation in which a raw material is heated to room temperature or higher in the presence of water or steam. It is not restricted to an operation in which an ordinary aqueous gel is heated in an autoclave.

The raw material may take various forms such as liquid, gas, solid, solution, colloid and the like.

The pressure employed may be atmospheric pressure or reduced pressure as in chemical vapor deposition.

Zeolite refers to an inorganic molecular sieve having a regular pore structure, made of aluminosilicate, in particular.

Part or the whole of the Al atoms present in the zeolite framework may be substituted by particular elements.

In the present invention, a Fe compound or Fe itself is added to a raw material to synthesize a Fe-containing zeolite.

In this way, there can be synthesized a high-silica aluminosilicate molecular sieve which is a zeolite of relatively uniform composition.

In zeolite synthesis, since optimum synthesis conditions need be employed depending upon the addition amount of Fe compound or Fe itself and the intended pore structure of zeolite to be synthesized, it is preferable to set up the synthesis conditions for said zeolite beforehand by using at least one raw material composition.

It is thought that by including Fe in the crystal structure of zeolite, the strain between crystal lattices is alleviated and crystallization of zeolite becomes easy; as a result, a zeolite of lower Al content than usual can be synthesized directly with relative ease.

Thereby, the control of Al content in zeolite becomes easy and a molecular sieve having properties not seen heretofore can be synthesized.

Further in the present invention, in-depth study was made to examine the effects of Si/Al molar ratio, Si/Fe molar ratio and Na compound (kind and amount) of raw material, on the specific surface area, hydrothermal resistance, etc. of aluminosilicate molecular sieve synthesized; and the levels of Si/Al molar ratio and Si/Fe molar ratio and the kind and amount of Na compound were specified.

In order for the high-silica aluminosilicate molecular sieve produced by the present process to have a hydrothermal resistance required for the HC adsorbent used for purification of exhaust gas from internal combustion engine (the HC adsorbent is a primary use of the molecular sieve), it is preferable to use, in the present process, a raw material having a Si/Al molar ratio of 50 or more and a Si/Fe molar ratio of 80 or less.

Since a lower Al content generally gives a higher hydrothermal resistance, the Si/Al molar ratio of raw material is preferably 50 or more and yet as large as possible.

In many zeolites such as β type and the like, the presence of Fe in a certain amount or more is thought to be necessary to alleviate the lattice strain during crystallization due to the low content of Al and produce an intended pore structure. Fe shortage invites non-crystallization of corresponding amount of Si and a reduced yield.

Hence, the Si/Fe molar ratio of raw material is preferably 80 or less. When the pore structure is, in particular, β type, the Si/Fe molar ratio is preferably 45 or less, more preferably 30 or less, particularly preferably 20 or less.

Preferably, the raw material further contains a $Na^+$ source.

The $Na^+$ source preferably contains NaOH, or NaOH and NaCl. In the latter case, the NaOH:NaCl molar ratio is preferably 3:4 to 7:0, more preferably 4:3 to 7:0.

The merits and effects brought about by the presence of Fe in silicate molecular sieve are as follows.

The Fe used in the present invention has a valency of 3 which gives an oxide most stable at room temperature and which is the same as that of Al. This Fe has an ionic radius relatively close to that of Al and can substitute Al easily.

Nevertheless, Fe, as compared with Al, is easily eliminated from the crystal lattices of aluminosilicate molecular sieve by calcination or ion-exchange operation.

Even when Fe goes out of framework, however, Fe does not seem to promote the destruction of zeolite structure, differently from Al. Rather, the Fe out of the zeolite framework is presumed to stay in the pores and function as an adhesive, thereby suppressing the destruction of crystal structure.

It is further presumed that the Fe staying in the pores makes a solid solution with eliminated Al, thereby preventing the movement of Al and the destruction of crystal structure.

For the above reasons, in the present process, heat treatment is conducted in an oxidizing atmosphere at 300° C. or higher, preferably 650–1,050° C. so that Fe goes out of the zeolite framework, whereby a high-silica aluminosilicate molecular sieve can be produced.

Further, a previous heat treatment in a temperature range in which a product is actually used can contribute to stabilization of a crystal structure of a high-silica aluminosilicate molecular sieve.

Thus, the present process for synthesis of a high-silica aluminosilicate molecular sieve can directly synthesize a zeolite low in Al content without dealumination operation and therefore can provide process simplification and a higher yield.

Further, the high-silica aluminosilicate molecular sieve synthesized by the present process can maintain its crystal structure up to at least a high temperature to which a zeolite (aluminosilicate) having about the same Si/Al molar ratio is stable. Therefore, the present high-silica aluminosilicate molecular sieve can be preferably used in applications where high heat resistance or high hydrothermal resistance is required, for example, the HC adsorbent used in the exhaust gas purification system (e.g. in-line type exhaust gas purification system) of internal combustion engine.

The preferable pore structure of the high-silica aluminosilicate molecular sieve synthesized by the present process is determined in view of the following matters when the molecular sieve is used particularly as an HC adsorbent for purification of exhaust gas from internal combustion engine.

Incidentally, in this specification, types of zeolite are indicated by typical names, which includes corresponding isomorphisms or the like.

First, the pore structure preferably has a high framework density [in the case of zeolites, the framework density is represented by the number of T atoms (the atoms surrounded by oxygen atoms and forming a $TO_4$ type tetrahedron) in 1 $nm^3$].

For example, pentasil type zeolite and ferrierite type zeolite have high framework densities for the pore diameters.

When a molecular sieve is used for HC adsorption, the pore diameter of the molecular sieve is required to have a size through which the HC molecules to be adsorbed can enter the molecular sieve. The size, however, is preferably close to the size of the HC molecules to be adsorbed because it allows strong adsorption of HC molecules by molecular sieve.

β type zeolite and mordenite type zeolite have pores larger than those of pentasil type zeolite and can adsorb even HC components of larger molecular sizes.

β type zeolite is known to have excellent adsorption capacity for $C_{6-8}$ aromatic hydrocarbons. Chabazite type and sigma-1 type having small pore diameters are suitable for adsorption for $C_{2-3}$ alkenes.

Coke formed from HC may deposit in the pores of molecular sieve. When the pores are linear and have no branches and when the two locations of one-dimensional pore are plugged by coke, the portion of the pore between the two plugged portions has no adsorbability. Therefore, the molecular sieve of the present invention preferably has a two-dimensional or three-dimensional pore structure.

All of the above-mentioned pentasil type, ferrierite type, β type, mordenite type, chabazite type and sigma-1 type have a two-dimensional or higher pore structure.

β type is particularly preferable because it can adsorb even larger HC components than pentasil type can, has a large HC adsorption capacity, and can be produced so as to have sufficient heat resistance by the present process.

The present invention is hereinafter described specifically by way of Examples. However, the present invention is not restricted to the Examples.

EXAMPLES 1–3 AND COMPARATIVE EXAMPLES 1–4

1. Synthesis of High-Silica β Type Aluminosilicate Molecular Sieves and Evaluation of Heat Resistances Thereof An aqueous silica gel containing Fe, Al and TEA cation $[(CH_3CH_2)_4N^+]$ was treated in an autoclave at 135° C. at an autogenous pressure for 6 days to give rise to crystallization. The resulting solids were filtered, washed with water, dried and subjected to heat treatment in air at 540° C. for 3.5 hours to remove TEA and have Fe go out of the zeolite framework of aluminosilicate molecular sieve to obtain a high-silica aluminosilicate. Then, the aluminosilicate was subjected to ion exchange with $NH_4^+$ ion and calcinated to remove $Na^+$ ion to prepare a Fe-containing β type silicate molecular sieve (Examples 1–3 and Comparative 1–2).

In Comparative Example 3, synthesis was conducted using a raw material containing substantially no Fe and having a Si/Al molar ratio of 15.

The results are shown in Table 1.

TABLE 1

|  | Si/Fe molar ratio* | Si/Al molar ratio* | Yield (%) |
| --- | --- | --- | --- |
| Example 1 | 45 | 150 | 40 |
| Example 2 | 25 | 150 | 66 |
| Example 3 | 18 | 150 | 88 |
| Comparative Example 1 | 75 | 150 | 27 |
| Comparative Example 2 | 22 | 48 | 89 |
| Comparative Example 3 | >1000 | 15 | 83 |

Note:
*molar ration is based on the composition of the raw meterial used.

Then, each of the above-obtained molecular sieves was subjected to a durability test of 1,000° C. and 4 hours in an atmosphere containing 10% of steam, in an electric furnace; and the specific surface areas (BET values) of molecular sieve before and after the test were measured; the value obtained by dividing the value after the test by the value before the test, i.e. the retention (%) of specific surface area was taken as the heat resistance of molecular sieve produced.

Comparative Example 4 is a case in which the molecular sieve obtained in Comparative Example 3 was subjected to repeated steam treatment and acid washing for dealumination.

The results are shown in Table 2.

TABLE 2

|  | Si/Fe molar ratio* | Si/Al molar ratio* | Specific surface area | | |
| --- | --- | --- | --- | --- | --- |
|  |  |  | Before test ($m^2$/g) | After test ($m^2$/g) | Retention (%) |
| Example 1 | 19 | 62 | 576 | 351 | 60.9 |
| Example 2 | 17 | 101 | 575 | 422 | 78.4 |
| Example 3 | 16 | 136 | 578 | 500 | 86.5 |
| Comparative Example 1 | 21 | 41 | 575 | 172 | 29.9 |
| Comparative Example 2 | 20 | 45 | 576 | 251 | 43.6 |
| Comparative Example 3 | >1000 | 12 | 675 | 52 | 7.7 |
| Comparative Example 4 | >1000 | 59 | 574 | 285 | 49.7 |

Note:
*molar ratio is based on the composition of the aluminosilicate molecular sieve produced.

EXAMPLES 4–11

2. Synthesis of High-Silica β Type Silicate Molecular Sieves and Evaluation of Heat Resistances Thereof An aqueous NaOH solution was added to colloidal silica ($SiO_2$: 30% by weight) solution to obtain a mixture. Thereto was added a solution obtained by adding an Iron nitrate nonahydrate $[Fe(NO_3)_3.9H_2]$ and aluminum nitrate nonahydrate $[Al(NO_3)_3.9H_2O]$ to an aqueous solution containing 35% by weight of tetraethylammonium hydroxide (TEAOH). Thereto was added an aqueous sodium chloride (NaCl) solution. The resulting mixture was stirred until it became homogeneous, to prepare various mixtures each having a different NaOH:NaCl molar ratio as shown in Table 3. All the mixtures had the following composition although their NaOH:NaCl molar ratios were different.

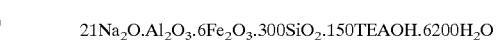

$21Na_2O.Al_2O_3.6Fe_2O_3.300SiO_2.150TEAOH.6200H_2O$

As seen above, in all the mixtures, the Si/Al molar ratio was 150 and the Si/Fe molar ratio was 25.

Each mixture was placed in a teflon container and heated in an autoclave at an autogenous pressure at 135° C. for 6 days. The resulting solid reaction product was separated by the use of a centrifuge, washed, dried at 80° C. and heat-treated in air at 540° C. for 4 hours to remove the template used.

The resulting powder was treated in an aqueous ammonium nitrate solution at 80° C. for 1 hour to conduct ion exchange. The resulting material was separated, washed, dried and calcined to prepare various $H^+$-type Fe-containing β type silicate molecular sieves.

Then, each of the above-obtained molecular sieves was subjected to a durability test of 1,000° C. and 4 hours in an atmosphere containing 10% of steam, in an electric furnace; and the specific surface areas (BET values) of molecular sieve before and after the test were measured; the value obtained by dividing the value after the test by the value before the test, i.e. the retention (%) of specific surface area was taken as the heat resistance of molecular sieve produced.

The results are shown in Table 3.

TABLE 3

| | Molar ratio when fed | | Specific surface area | | |
|---|---|---|---|---|---|
| | | | Before test | After test | Retention |
| | NaOH | NaCl | (m²/g) | (m²/g) | (%) |
| Example 4 | 7 | 0 | 633 | 420 | 66.4 |
| Example 5 | 6 | 1 | 640 | 431 | 67.5 |
| Example 6 | 5 | 2 | 636 | 417 | 65.6 |
| Example 7 | 4 | 3 | 623 | 415 | 66.6 |
| Example 8 | 3 | 4 | 503 | 341 | 67.8 |
| Example 9 | 2 | 5 | 498 | 300 | 60.2 |
| Example 10 | 1 | 6 | 480 | 273 | 56.9 |
| Example 11 | 0 | 7 | 451 | 230 | 51.0 |

As described above, the process for synthesis of high-silica silicate molecular sieve according to the present invention can give a high-silica zeolite low in Al content directly without dealumination operation, and can provide process simplification and a higher yield.

Since the above merits are based on the properties of Al and Fe in zeolite, the same merits can be obtained when zeolites other than β type are made into high-silica.

The high-silica aluminosilicate molecular sieve produced according to the present process can be preferably used in applications where high heat resistance or high resistance to water and heat is required, for example, the HC adsorbent used in the exhaust gas purification system (e.g. in-line type exhaust gas purification system) of internal combustion engine.

What is claimed is:

1. A process for synthesizing a high-silica aluminosilicate molecular sieve having a β type zeolite structure, which comprises subjecting, to hydrothermal synthesis, a raw material containing Al, H, O and Si and, as other elements at least Fe, and having a Si/Al molar ratio of 50 or more and a Si/Fe molar ratio of 45 or less and then subjecting the resulting material to heat treatment in an oxidizing atmosphere at 300° C. or more, wherein the Si/Al and Si/Fe molar ratios are such that the resultant zeolite retains at least 60.9% of its surface area upon heating at 1000° C. for 4 hours in an atmosphere containing 10% steam.

2. A process according to claim 1, wherein the raw material contains a $Na^+$ source.

3. A process according to claim 2, wherein the $Na^+$ source contains NaOH.

4. A process according to claim 2, wherein the $Na^+$ source contains NaOH with and without NaCl and the NaOH:NaCl molar ratio is 3:4 to 7:0.

5. A process according to claim 1, wherein the heat treatment is conducted in an oxidizing atmosphere at 650–1,050° C.

* * * * *